United States Patent [19]

Kidney et al.

[11] Patent Number: 4,984,279

[45] Date of Patent: Jan. 8, 1991

[54] IMAGE PROCESSING AND MAP PRODUCTION SYSTEMS

[75] Inventors: Paul D. Kidney; Andrew S. Rowlands; William P. Mills, all of Dublin, Ireland

[73] Assignee: Emyville Enterprises Limited, Dublin, Ireland

[21] Appl. No.: 295,374

[22] Filed: Jan. 10, 1989

[30] Foreign Application Priority Data

Jan. 4, 1989 [IE] Ireland .................................. 12/89

[51] Int. Cl.⁵ ............................................. G06K 9/00
[52] U.S. Cl. ........................................ 382/1; 382/45; 358/450; 358/452
[58] Field of Search ................... 382/44, 45, 48, 61, 382/57, 1; 358/109, 450, 452, 453, 462, 183; 342/64

[56] References Cited

U.S. PATENT DOCUMENTS

| | | | |
|---|---|---|---|
| 4,396,903 | 8/1983 | Habicut et al. | 342/64 |
| 4,688,091 | 8/1987 | Kamel et al. | 382/45 |
| 4,812,909 | 3/1989 | Yokobayashi et al. | 358/183 |
| 4,827,330 | 5/1989 | Walsh et al. | 358/452 |

Primary Examiner—David K. Moore
Assistant Examiner—Yon Jung
Attorney, Agent, or Firm—Young & Thompson

[57] ABSTRACT

A map is prepared from a satellite image defined by digital data by integrating the image data with a digitised representation of geographical features within the map area and with text data defining textual material to appear in the finished product. This integration of data includes comparing each element of image data with an element or elements of feature data and replacing or modifying the element of image data as required to incorporate any feature or features defined by the element of feature data, and comparing the resulting combined image and feature data element with an element or elements of text data and replacing or modifying the combined data element as required to incorporate textual material defined by the element of text data. This integration of data may also include modification of the elements of integrated data in boundary regions surrounding features or text to provide a "burned-in" appearance in the finished product, as distinct from the appearance provided by overlay printing.

17 Claims, 4 Drawing Sheets

IMAGE PROCESSING AND MAP PRODUCTION SYSTEMS

BACKGROUND OF THE INVENTION

1. Field of the Invention

This invention relates to image processing and map production systems. The invention is especially directed to the processing of images or data derived by remote-sensing systems, which may be, for example, satellite-borne or airborne, and in which the imaging or data is suitably recorded in digital form. In the context of the present disclosure therefore, the terms "satellite image" and "satellite data" are to be understood as encompassing also images or data furnished by other remote-sensing systems and especially by airborne remote-sensing systems, while the term "remote-sensing" is to be interpreted as embracing satellite-borne and airborne imaging and data collection techniques for recording information relating to geographical areas or regions. In particular, the invention relates to the processing of satellite images and the preparation of maps from such images. The invention also extends to integration of data from conventional maps with satellite image data, to provide a satellite image map.

2. Description of the Prior Art

Traditional methods of mapping are known over a long number of years and are highly developed. They allow extreme accuracy over small areas, but are relatively costly to apply over larger regions. Thus by and large only developed areas of the world have been mapped with any high degree of accuracy, as detailed surface measurements are not readily practicable in unpopulated, difficult and inaccessible country. In more recent times, aerial photography has greatly enlarged the scope for accurate mapping over larger areas, while satellite imaging (space-borne remote sensing) now offers even better opportunities for surveying virtually any part of the world, irrespective of its accessibility or otherwise.

Space-borne remote sensing systems may be either passive or active. In a passive system, naturally available radiation in the form of reflected light or emitted ambient thermal energy is recorded. Reflection represents radiation that is neither absorbed nor transmitted. Since the extent to which energy is reflected, absorbed or emitted is different for different objects and also depends on wavelengths, by measuring reflection, absorption and emission, appropriate parameters may be determined to distinguish between different environmental features. Objects that appear similar in one waveband may be quite distinguishable in another. In the visible spectrum, these variations are perceived as colour.

In an active system, an artificial energy source is used, for example light, radar pulses or laser beams, and the returned signal or echo of a transmitted energy beam aimed at an object gives a measure of reflectance or absorption.

Remote sensing techniques allow either single broad-band imaging, as in panchromatic photography, or objects are observed simultaneously in a number of wavelength bands in a multi-spectrum technique. A combination of passive multi-spectral scanning and active microwave imaging is used in some of the more successful satellite systems. While certain passive systems have a relatively coarse spatial resolution, radar-type developments of active systems can yield spatial resolutions down to approximately 10 meters, resolution being defined here as the minimum distance between two objects at which they still appear distinct and separate on an image or photographic representation. Objects which are closer together than the resolution limit appear as a single object. In digital work, resolution is also defined in terms of the pixel size of scan. This can provide ground resolution from 80 meters down to 1 meter.

Satellites for use in imaging typically move around the earth in circular, substantially polar orbits, preferably arranged so that the satellite crosses the equator at approximately the same local sun time on each pass. In this way, data collection takes place at all times and all points under identical light conditions for each season of the year. The orbits are further organised so that complete coverage of the entire surface of the world takes place over a cyclic period typically occupying some 3 to 4 weeks.

In one of the Landsat systems, for example, a line-scanner device is used which continually scans the surface of the earth along a 185-kilometer-wide swath perpendicular to the satellite's orbital motion. By mirror sweep scanning, a number of scan lines are recorded simultaneously in each of a number of spectral bands. Each band is provided with a number of detectors corresponding to variations in the intensity of reflected sunlight. A nominal instantaneous field of view of each detector is typically a square corresponding to a ground resolution cell of 79 meters square. The analogue output of each detector is encoded as digital data. Under certain conditions, objects smaller than the minimum ground resolution can also be recorded. For example, for an object having a reflectance differing significantly from its immediate surroundings, that object is reproduced by the satellite image, even if smaller than the minimum resolution. In the same manner, an object larger than the minimum resolution but having a very low reflectance contrast with its surroundings may not appear on the image. Also reflectance varies from band to band.

Thus in a particular Landsat system, each scan line may contain in excess of 3,000 discrete pixels, and, in a single standard Landsat image, there are typically in excess of 2,000 scan lines. Thus, with the different bands, each Landsat scene is made up of more than 30 million individual observations. Data is collected in digital form, and is thus most suitably processed by computer techniques.

Digital processing techniques also guard against loss of data and ensure faithful rendering of each scene. They also facilitate image restoration, enhancement and classification. Standard corrections and enhancements may be made to suit specific users. Techniques applied in image restoration may include radiometric corrections and geometric corrections. Each pixel may be separately processed for each of the four bands recorded in the original Landsat image, to provide cosmetic improvements in the final appearance of the image. Image enhancement techniques include contrast stretching, density slicing, edge enhancement and spatial-directional filtering. The finally processed data is then transferred onto diapositive film at whatever scale is desired.

Image output is typically in so-called false-colour. The reason for this is that the standard image provided by Landsat and many other satellites has the spectral properties of an infrared colour photograph. The observable differences in colour formation are determined by an object's high reflectance in any of four spectral bands. Thus high reflectance in the green band reproduces as blue, red reflectance reproduces as green, and high infrared reflectance as red. Thus in false-colour, healthy green vegetation generally appears in various tones of red. Green objects will register in blue.

For use by lay readers, false-colour composites are preferably transformed into a normal-colour image. In normal colour, it is far easier to recognise landscape and environmental features. Thus green vegetation is represented by shades of green, and agricultural areas range from green to brown and orange depending on season. Tonal variations in true colour are very carefully controlled to ensure that the different features of the original image can be identified without difficulty. Thus colour scales must be optimised, to enable preparation of suitable colour separations from the original false-colour digital data.

These known techniques are well established and result in satellite image reproduction having varying degrees of technical value and aesthetic appeal. In order to facilitate users in identifying features on reproductions of satellite images, it is also known to print text and other representational material as an overlay on the printed reproduction of the satellite image. The resulting product tends to be somewhat ineffective as a useful means of conveying information, as overlaid material frequently merges with its background, depending on the nature of the features imaged and on the nature and characteristics of the material printed as an overlay.

BRIEF SUMMARY OF THE INVENTION

It is accordingly an object of the invention to provide an improved method of integrating satellite images with representational data, including text information. It is a further objective of the invention to provide an improved method of reproducing satellite image data to yield a smooth and uniform representation of a relatively extensive land area from a number of individual image data records gained on separate occasions and recorded as individual packages.

According to the invention, there is provided a method of making a map comprising the steps of:

(a) processing data collected by remote-sensing to provide image data usable to define a pictorial representation of a selected region, said image data consisting of a multiplicity of elements of data, and each of said elements of data containing image information, (b) digitising a representation of geographical features within said selected region to provide feature data, said feature data consisting of a multiplicity of elements of data, and at least some of said elements of data containing feature-defining information, and (c) integrating said image data with said feature data to provide combined data usable to define a pictorial representation of said selected region, said combined data consisting of a multiplicity of elements of data, wherein said image data and feature data integrating step includes (i) establishing, for each element of image data, whether any corresponding element or elements of feature data exist, (ii) for each element of image data for which one or more corresponding elements of feature data exist, comparing said each element of image data with said one or more corresponding elements of feature data, (iii) for said each element of image data for which at least one of said one or more corresponding elements of feature data is a feature-defining element, modifying said each element of image data to provide an element of said combined data incorporating information pertaining to a feature or features defined by said feature-defining element, (iv) for said each element of image data for which none of said one or more corresponding elements of feature data is a feature-defining element, said each element of image data providing an element of said combined data containing only image information, and (v) for any element of said image data to which no element of feature data corresponds, said any element providing an element of said combined data containing only image information.

Each element of image data may be a pixel, and each element of feature data may also be a pixel. Each said pixel of image data and each said pixel of feature data may be of the same size, but this is not essential. In a favoured mode of use of the invention, said data collected by remote-sensing is collected by satellite-sensing. Suitably said data collected by remote sensing is digital data, or alternatively said data processing step includes digitisation of said data collected by remote-sensing.

Said data processing step may include amalgamation of data from two or more batches of data collected by remote-sensing to provide a single set of said image data, while said batches may include a plurality of waveband records for an area encompassed by a single remote-sensing operation. Alternatively, said batches may include records for a plurality of areas, each encompassed by a separate remote-sensing operation.

In one variant of the method according to the invention, said digitising step comprises digitising an existing map of said selected region. Alternatively, preparatory to said digitising step, said image data is printed to provide a pictorial representation of said selected region, and selected geographical features are traced from said pictorial representation to provide said representation of geographical features for said digitising step.

In another exemplification of the method of the invention, said digitising step comprises displaying said image data to provide a pictorial representation of said selected region and deriving said feature data directly from said displayed image by means of a digital overlay technique. Said digital overlay technique may comprise directing a cursor to traverse said displayed pictorial representation of said selected region along one or more paths defining said geographical features of said selected region and storing information descriptive of said path or paths to provide said feature data, or alternatively said digital overlay technique may comprise moving a light pen over said displayed pictorial representation of said selected region along one or more paths defining said geographical features of said selected region and storing information descriptive of said path or paths to provide said feature data.

In a favoured embodiment of the method of the invention, each element of said combined data either incorporating information defining an edge region of a feature in a pictorial representation of the combined data, or within a defined spacing from an element of said combined data incorporating information defining an edge region of a feature in said pictorial representation of the combined data, may be modified to incorporate information defining, in said pictorial representation of the combined data, a surrounding region separating said feature from other information contained in said each element of said combined data.

The method may also comprise the further step of outputting said combined data to provide one or more representations of said selected region usable for printing purposes.

In order to embody text data, the method of the invention may also comprise the further steps of (1) preparing text for disposition at appropriate locations within said selected region in a pictorial representation thereof, (2) digitising said text to provide text data, said text data consisting of a multiplicity of elements of data, and at least some of said elements containing text-defining information, and (3) integrating said text data with said combined data to provide printing data including image data, feature-defining data and text data, and consisting of a multiplicity of elements of data.

Said combined data and text data integrating step may include (i) establishing, for each element of combined data, whether any corresponding element or elements of text data exist, (ii) for each element of combined data for which one or more corresponding elements of text data exist, comparing said each element of combined data with said one or more corresponding elements of text data, (iii) for said each element of combined data for which at least one of said one or more corresponding elements of text data is a text-defining element, modifying said each element of combined data to provide an element of said printing data incorporating information pertaining to text defined by said text-defining element, (iv) for said each element of combined data for which none of said one or more corresponding elements of text data is a text-defining element, said each element of combined data providing an element of said printing data containing only image and/or feature information, and (v) for any element of said combined data to which no element of text data corresponds, said any element providing an element of printing data containing only image and/or feature information.

Preferably each element of said printing data either containing information defining an edge region of text in a pictorial representation of the printing data, or within a defined spacing from an element of said printing data incorporating information defining an edge region of text in said pictorial representation of the printing data, is modified to incorporate information defining, in said pictorial representation of the printing data, a surrounding region separating said text from other information contained in said each element of said printing data. Said text may be laid down on a substrate preparatory to digitisation, or said text may be digitised directly as character data with associated locational and attribute information.

The method of the invention may also comprise the further step of outputting said printing data to provide one or more representations of said selected region usable for printing purposes. Said outputting step may comprise the production of a plurality of colour separations, for colour printing.

The invention also extends to a map when made by the method as defined above.

BRIEF DESCRIPTION OF THE DRAWINGS

The method of the invention will now be described having regard to the accompanying drawings, in which.

DETAILED DESCRIPTION OF THE DRAWINGS

Figure 1:
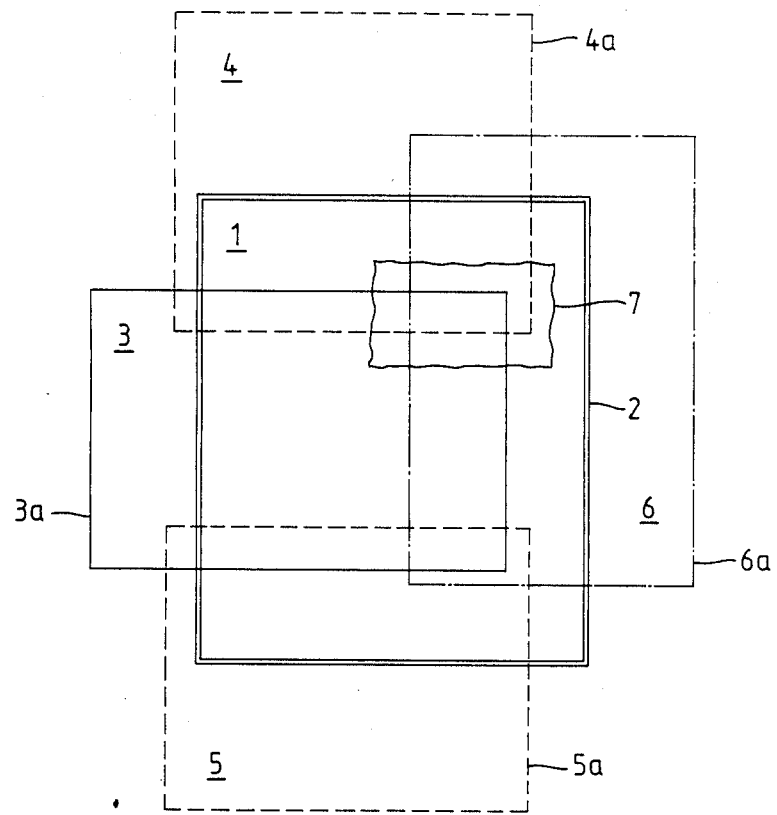
FIG. 1 shows a region for which a satellite picture is to be prepared from portions of four separate partially overlapping satellite images, as indicated in the drawing.

As shown in FIG. 1, the area 1 bounded by the double line 2 represents a region for which it is desired to prepare a satellite map by the method of the invention. In order to provide such a map, largely cloud-free satellite pictures or image data must be available for the entirety of the region 1 in question. By reference to indexes of world coverage provided by the satellite companies, it can be established whether or not substantially cloud-free image data is available for the complete area of the region in question. A computer link to the satellite company's data bank facilitates direct interrogation of the satellite company's data to establish whether or not this is the case.

Four notional available image areas 3, 4, 5 and 6, are indicated by the other solid, 3a, dotted, 4a, 5a, and chain-dotted, 6a, areas on the representation of FIG. 1. It is assumed that generally cloud-free images are available for each of these. If no more or less cloud-free image is available, then the satellite system may be instructed to record such an image on its next available traverse of the region in question. Alternatively, and depending on the extent of the cloud cover, the cloud data may be processed and merged with the clear-image data.

For each of the imaged regions, the data is then delivered on computer tape. For one particular satellite company, three tapes are furnished, each tape providing image data in a particular colour band. These bands may be green, red and infrared. The Landsat system provides up to seven bands, of which blue, green, red and infrared are of interest to satellite map makers. For images or data provided by airborne sensing, different bands may be used.

The computer tapes are loaded and processed on a computer system by the satellite map maker. Each imaged region 3, 4, 5 or 6, may then be displayed on the computer screen, and colours are assigned to the bands, typically in false colour during the initial stages of processing. A multiplicity of known programming methods are available for carrying out these stages of the operation.

Figure 2:
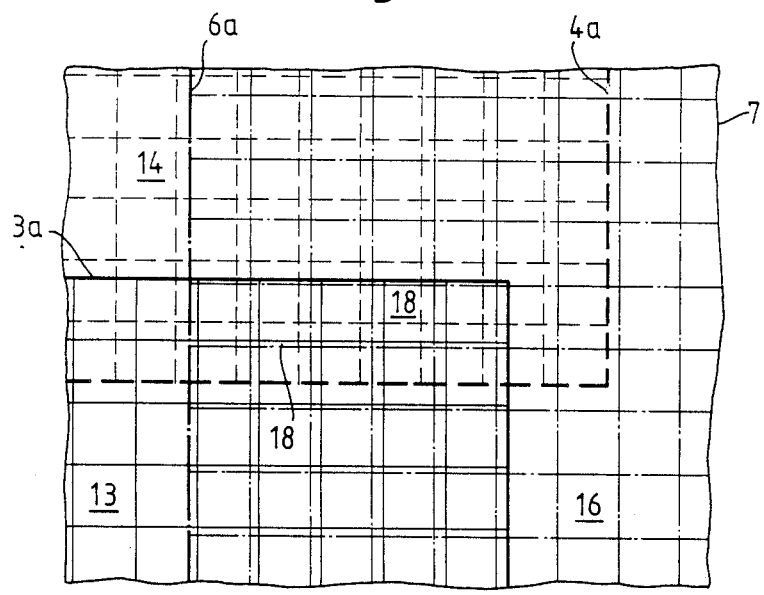
FIG. 2 is a detail of an area of FIG. 1 where three satellite images overlap.

In order to build up an image for the required area, as indicated by the double bordered region 1 in FIG. 1, data must be used from portions of the various overlapping satellite images 3, 4, 5, and 6, available. In the overlap region 7 of FIG. 1, shown enlarged in FIG. 2, there is a choice of pixel or image data. The various images 3, 4, 5 and 6 may also have different pixel sizes to give different resolutions in each image area. In region 7 therefore, the choice of pixel to describe an image portion 18 is thus left to a skilled operator, using appropriate programming tools on the computer system, to select as between a pixel 13 from image area 3, a pixel 14 defining a region or element of image area 4, or a pixel 16 from image area 6. Similar decisions are applied to other sectors of overlap.

Figure 5:
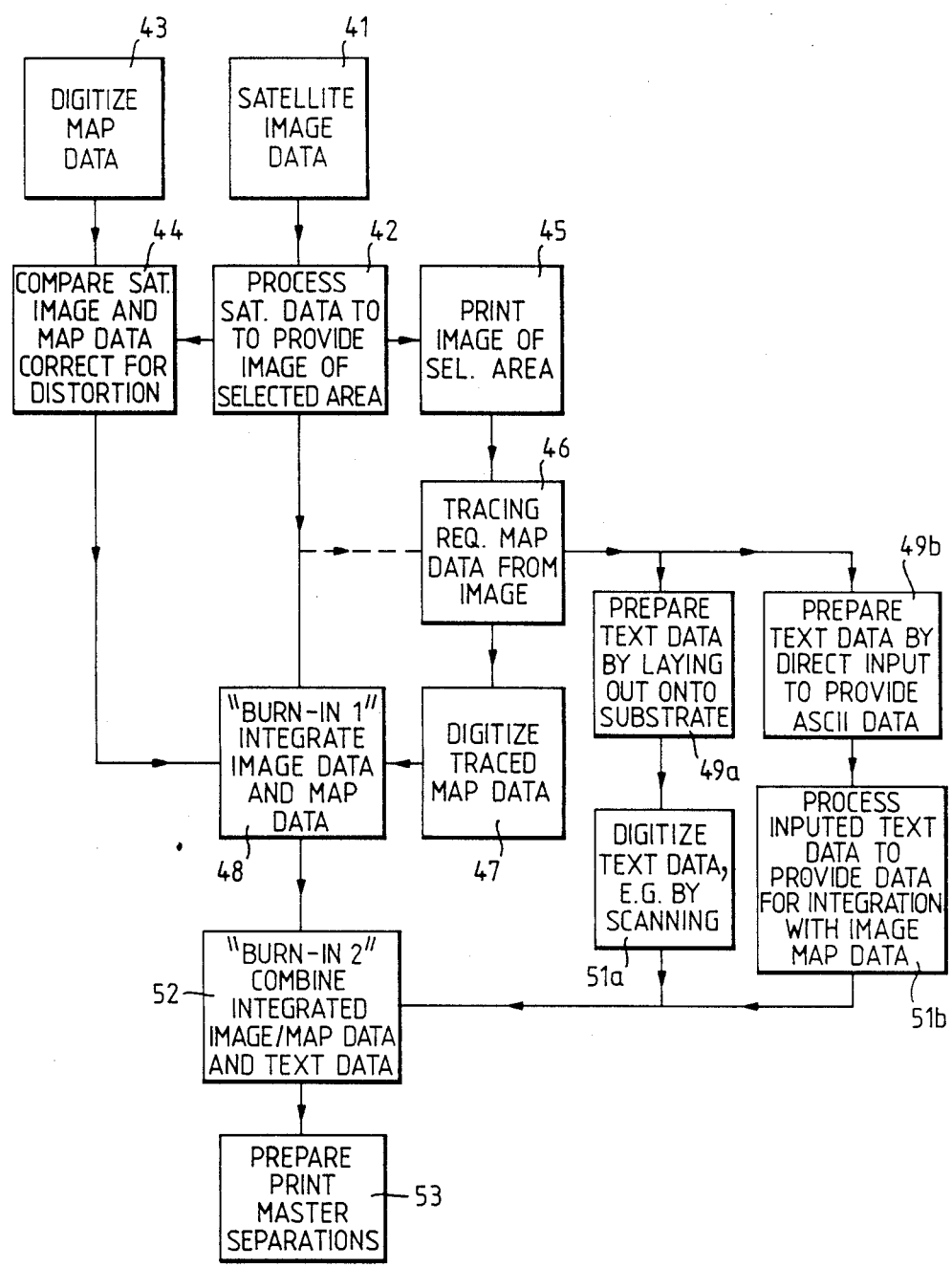
FIG. 5 is a flow diagram showing the various stages in the processing of data to provide an integrated reproduction of the satellite image for a specific area and associated representational data.

These stages are indicated in the flow diagram of FIG. 5. The assembly or collection of satellite image data is indicated by reference 51. This data is then transferred to the step indicated by reference 52, where the satellite data is processed to provide an image of the selected area, for example, in the manner described above in regard to FIGS. 1 and 2. If a true colour image is required, the next stage is to prepare colour scales equating the various false colours to the required true colours. Again, computer techniques are used, but human intervention and judgment is needed, especially in building up appropriate colour scales and interpreting the information available on the satellite image data. This processing step is not designated separately in FIG. 5, but takes place within the steps encompassed by reference 42.

If no further steps are involved and the satellite image is then to be printed for use, for example, for poster purposes or the like, then the data is next sent for laser printing onto a negative at this stage. Printing takes place using colour separations derived from the image data to provide the finished product by high quality printing processes. This form of output is not indicated independently in the flow diagram of FIG. 5, and takes place within the general ambit of reference 42. Printing at this stage may also be carried out in false colour, and the stages required in adapting the data to provide true colour output may be omitted.

A particular feature of the system of the invention is the integration of traditional map data with the satellite image. Alternative techniques, both of which are indicated on the flow diagram of FIG. 5, are available for carrying out this step. In the first such technique, a traditionally prepared map of the region to be imaged is digitised, reference 43, so that all of the information to be printed on the finished satellite map is stored in computer-readable form. Depending on circumstances, this digitised data may or may not be directly usable for integration with the satellite image data. Most usually, at least some correction of either the digitised map data and/or the image data for certain distortions will be required, reference 44, so as to ensure that when the map data is printed onto the satellite image, there is correct registration of the digitised map features with their images as recorded by the satellite system. Distortions exist in traditional maps for a number of reasons, including map projection techniques, which lead to deviations particularly at the edge regions of maps, where the curved surface of the earth is projected onto the flat surface of the map page. Distortions also exist due to the exaggerated dimensions of conventional symbols such as roads on traditional maps. Exaggeration is however necessary so that the features in question can be distinguished. Further distortion may exist in the satellite image itself in that the image may not necessarily be recorded from a position vertically over the region photographed. In other words there may be a slight angling effect, which also has to be compensated before the map data and the image data can be combined or integrated. In general, if the quality of the map is good, then it will often be preferable to adjust the image data, but where map reliability is poor, then the image data will take precedence.

Accordingly, an alternative system of preparing the data for the satellite map is to initially print out the image data in precisely the same size as the intended final size of the satellite map to be produced, reference 45. This printed image is then compared against a traditional map of the region and the roads and other features requiring to be represented on the finished satellite map are traced off the satellite image onto a suitable transparent material, reference 46. Features such as roads are usually clearly identifiable in high definition satellite images, although certain other features may be less discernible, but features such as county or district boundaries which have no physical reality on the ground but may require to be shown on the map, must be located by reference to identifiable features on the satellite image. It is important that both the satellite image and the tracing prepared from it are on dimensionally stable materials, so that no additional distortions are introduced at this stage. When the tracing 46 is prepared and all of the features requiring to appear on the finished satellite map have been included on it, the traced data is then digitised, reference 47. By proceeding in this way, the digitised features are in a format which is fully compatible with the image data, and difficulties of registration are minimised.

It is also possible to "trace" the map data directly off a screen display. i.e. to cause a cursor to traverse a path following a map feature to be digitized and to record the path followed by the cursor. This may be carried out using appropriate software in conjunction with a tracker ball, mouse or graphics tablet. Alternatively a light pen may be used, working directly on the screen to move along the path defined by the imaged feature. In this way, the step of physically tracing from a print of the image may be avoided, and feature data digitized directly. In this variant, step 45 is bypassed, and steps 46 and 47 take place substantially simultaneously from cursor or light pen path data.

Figure 3:
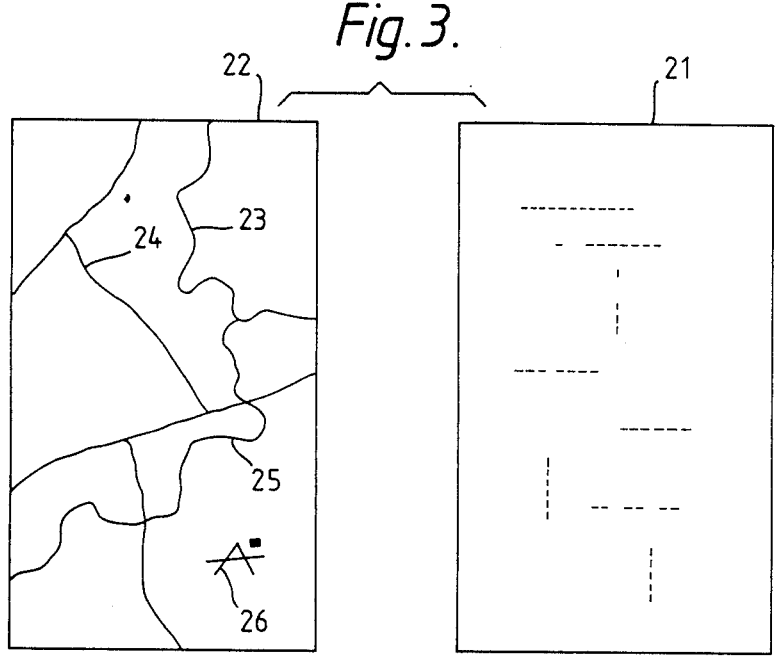
FIG. 3 is a diagrammatic representation of the preparation of a traced overlay delineating certain representational features from a printed satellite image.

The foregoing method involving tracing from a printing of the satellite image is preferred for more complex or large-scale maps, but for relatively small-scale satellite maps, direct digitisation of the map and subsequent correction. 44, by computer/manual input is generally acceptable. FIG. 3 shows in schematic form, on the right hand side, a satellite image 21, and, on the left hand side, a tracing 22 prepared from it showing a portion of coastline 23, some roads 24, a river 25 and an airport 26.

The digitised data 47 from the tracing 46 is then "burned in" or integrated fully into the satellite image data, reference 48, FIG. 5. The features recorded digitally in conventional mapping terms, step 47, are not applied to the satellite image from step 42 as an overlay. A computer controlled process takes place in which the digitised data 42 for each region of the image, at pixel level in display or printing terms, is compared with the digitised map feature data 47, and where this latter contains feature-defining-information, it takes precedence, together with an appropriate bounding or boundary region or area, over the original satellite image at 42, to ensure that in the finally printed satellite map the mapped features 47 will stand out against the background of the satellite image 42.

The first step in the operation is to establish whether or not any digitised map feature data exists for the particular pixel or element of image data being so compared. If the feature data is also in pixel format, and the respective pixels are of the same dimensions, then a straight pixel by pixel comparison may take place, and where the feature pixel contains feature-defining information, it either modifies or completely replaces the corresponding pixel of image data to provide an element of the combined or integrated data resulting from this stage of the process of the invention. Thus, in these circumstances, the satellite image data 42 may be essentially wiped out or erased underneath the merged or burned-in map features 47 incorporated at this stage, and also over a boundary or surrounding region in the printed pictorial representation of the data, so that the features will stand out in a clearly distinguishable manner from the image data in a finished satellite map prepared on the basis of the combined or integrated data. This provision of, according to the present invention, a surround or boundary region in digital data by modifying digital image data, or by over-riding or erasing or over-writing the digital data, differs from the defining of such a feature by modifying tint data. Where the feature data element does not contain feature-defining information, or where no element of feature data corresponds to the element of the image data in question, then the element of image data remains unchanged and forms an element of the combined or integrated data.

Where the pixel sizes of the image and feature data differ, or where the feature data is defined in terms of attributes (e.g. lines represented as curves or polygons defined in terms of co-ordinates rather than on a pixel basis), then modification of the image data or pixels may be in question rather than any kind of pixel-by-pixel comparison and replacement. In both of these situations and also in regard to pixel by pixel comparison or replacement, proprietary commercial programming techniques and programs are available to carry out the steps and operations required, and in particular, in the case where the feature data is in non-pixel form, to determine from the digitized information or data defining the feature data, whether or not any particular element or pixel of image data requires to be modified, or replaced, and, if modification is in question, the nature and extent of the modification necessary.

Figure 4:
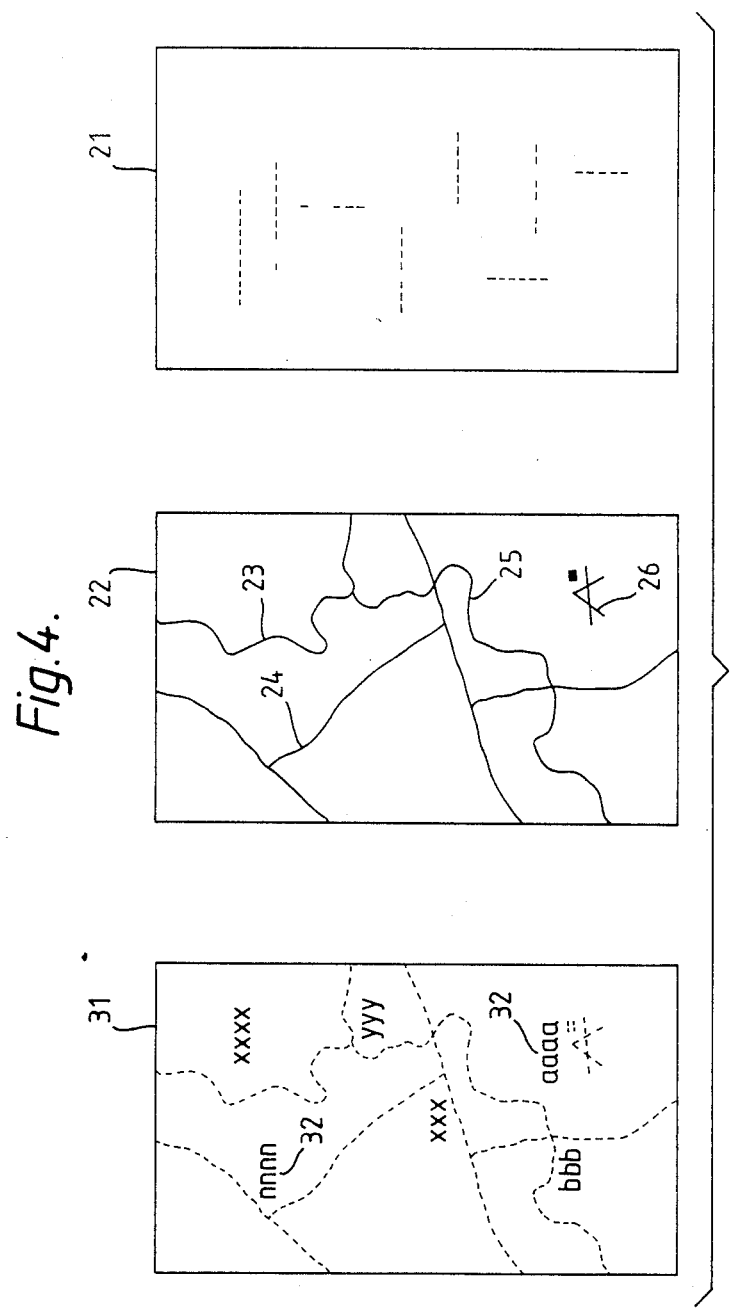
FIG. 4 is a diagrammatic representation of the preparation of text data for association with the satellite image and representational material of FIG. 3.

The next stage is to prepare text data, reference 49, for similar integration with the combined map feature data and satellite image data in a further burning in or data integrating stage. Again two methods are available. In the first such method, the text required is typeset and laid down on a film or other substrate at appropriate locations. This may be done manually. The text may be laid down while the substrate is overlaid on the tracing showing the map features, so that the lettering will appear in precisely the right place. FIG. 4 shows the items already depicted on FIG. 3 together with the further material necessary to prepare text data 31, on the left hand side. The locations 32 of text are indicated, and also shown in dotted outline are the map features 23 to 26 of the central compartment of FIG. 4, so that the location of the lettering adjacent to particular features can be clearly seen. In fact, these features, depicted in the left-hand compartment of FIG. 4 in ghost outline, do not appear on the text preparation substrate in practice, and are shown here only to explain the principles of the invention. The typeset text 32 is surrounded by appropriate boundary regions, again for distinguishing between the text and the background.

Following preparation of this text material, it is again digitised, reference 51, for amalgamation or burn-in in single pixel or other mode to provide a final assembly of computerised printing data suitable for preparing separations for printing. Again, the data is integrated, step 52, with the computer data containing both the map features and the satellite image material in such a way that the text data takes precedence over everything else, whether map feature or satellite image. In this way, any overlay effect is again avoided, and the text stands out in the finished product. Thus the combined feature and image data is modified or wiped out or erased underneath the merged or burned-in text data and also over a boundary or peripheral region surrounding the text, so that the text will stand out in the finished satellite map.

These so-called "burn-in" stages use commercially available software, which is capable of combining material of different resolutions. Thus, as already noted, data replacement in the original image data is not necessarily one-for-one on a pixel basis. The image data may be, for example, 6 pixels/mm, while text or feature data may be, for instance, 38 pixels/mm. The programmes used allow combination of data of different resolution while also providing aesthetically pleasing results.

The alternative method of preparing text data involves assigning co-ordinates for each portion of text data to be inserted on the map. The data is then set up in conventional ASCII form, and additional computer data characters associated with each batch of text, namely to define the attributes of the text such as font, size, framing and so on. This data consisting of ASCII strings and attribute material is then converted into vector strings, which are rastered or scanned to provide digitised text data for burn-in onto the integrated image and map data to provide the final pre-printing computer data 52 defining the satellite map. As in the case of the feature data, the commercial software used enables comparison of the text data with the data from a previous stage of the system or method of the invention, namely image data or combined or integrated image and feature data, and allows modification or replacement of that previous data as required, whether on a pixel by pixel basis, or by establishing from the content and attribute information of each element of text data, the need or otherwise for modification or replacement of an element of the data from the previous stage, and, if modification is required, the nature and extent of such modification. The resulting data may be outputted as a Chromalin (Trade Mark) to provide an advance indication of the anticipated finished product, or a machine proof may be prepared.

The final stage 53 makes use of this integrated computer data to prepare a number of colour separations for use in the printing process. Typically four separations are used, cyan, yellow, magenta and black. Dimensional stability is exceedingly important to ensure a very high quality of output, as is the quality of the paper used for the final print product. The output of the final printing is a so-called satellite map, consisting of a satellite image with, integrated into the satellite image, conventional map features such as roads, airports, public locations, railways, and other communications features, along with text data identifying these features and other geographical locations. The system of the invention ensures that the finished product does not in any way resemble the result of overlay printing, and ensures an extremely high quality of integration and representation of map data on the satellite image. The system of the invention combines high quality with a large choice of colours, conventions as to width, key lines, casings and feature sizes etc., and, in regard to text, a choice of, inter alia, fonts and size, to an extent no capable of being achieved using overlay printing.

We claim:

1. A method of making a map comprising the steps of:
   (a) processing data collected by remote-sensing to provide image data usable to define a pictorial representation of a selected region, said image data consisting of a multiplicity of elements of data, and each of said elements of data containing image information,
   (b) digitising a representation of geographical features within said selected region to provide feature data, said feature data consisting of a multiplicity of elements of data, and at least some of said elements of data containing feature-defining information, and
   (c) integrating said image data with said feature data to provide combined data usable to define a pictorial representation of said selected region, said combined data consisting of a multiplicity of elements of data, wherein said image data and feature data integrating step includes
   (i) establishing, for each element of image data, whether any corresponding element or elements of feature data exist,
   (ii) for any element of said image data to which no element of feature data corresponds, said any element providing an element of said combined data containing only image information,
   (iii) for each element of image data for which one or more corresponding elements of feature data exist, establishing for each of said one or more corresponding elements of feature data whether said each of said one or more corresponding elements of feature data contains feature-defining information,
   (iv) where said each of said one or more corresponding elements of feature data contains feature-defining information, said each of said one or more corresponding elements of feature data which contains feature-defining information providing an element of said combined data incorporating information pertaining to a feature or features defined by said each of said one or more corresponding elements of feature data which contains feature-defining information, and
   (v) where none of said one or more corresponding elements of feature data contains feature-defining information, said each element of image data providing an element of said combined data containing only image information.

2. A method according to claim 1, wherein each element of image data is a pixel, each element of feature data is a pixel, and each said pixel of image data and each said pixel of feature data are of the same size.

3. A method according to claim 1, wherein said data collected by remote-sensing is collected by satellite-sensing and is digital data, and said step of processing data collected by remote-sensing includes digitisation of said data collected by remote-sensing.

4. A method according to claim 1, wherein said step of processing data collected by remote-sensing includes amalgamation of data from two or more batches of data collected by remote-sensing to provide a single set of said image data, and said batches include a plurality of waveband records for an area encompassed by a single remote-sensing operation, or comprise records for a plurality of areas, each encompassed by a separate remote-sensing operation.

5. A method according to claim 1, wherein said digitising step comprises digitising an existing map of said selected region, or, preparatory to said digitising step, said image data is printed to provide a pictorial representation of said selected region, and selected geographical features are traced from said pictorial representation to provide said representation of geographical features for said digitising step.

6. A method according to claim 1, wherein said digitising step comprises displaying said image data to provide a pictorial representation of said selected region and deriving said feature data directly from said pictorial representation by means of a digital overlay technique, said digital overlay technique comprising directing a cursor to traverse said pictorial representation of said selected region along one or more paths defining said geographical features of said selected region and storing information descriptive of said path or paths to provide said feature data, or moving a light pen over said pictorial representation of said selected region along one or more paths defining said geographical features of said selected region and storing information descriptive of said path or paths to provide said feature data.

7. A method according to claim 1, wherein each element of said combined data within a defined spacing from another element of said combined data which incorporates information defining an edge region of a feature in a pictorial representation of the combined data is modified to incorporate information defining, in said pictorial representation of the combined data, a surrounding region separating said feature from other information contained in said pictorial representation.

8. A method according to claim 1, comprising the further step of outputting said combined data to provide one or more representations of said selected region usable for printing purposes.

9. A method according to claim 1, comprising the further steps of
   (1) preparing text for disposition at appropriate locations within said selected region in a pictorial representation thereof,
   (2) digitising said text to provide text data, said text data consisting of a multiplicity of elements of data, and at least some of said elements of data containing text-defining information, and
   (3) integrating said text data with said combined data to provide printing data including image data, feature data containing feature-defining information and text data containing text-defining information, and consisting of a multiplicity of elements of data.

10. A method according to claim 9, wherein said step of integrating said text data with said combined data includes (i) establishing, for each element of combined data, whether any corresponding element or elements of text data exist, (ii) for any element of said combined data to which no element of text data corresponds, said any element providing an element of printing data containing only image and/or feature-defining information, (iii) for each element of combined data for which one or more corresponding elements of text data exist, establishing for each of said one or more corresponding elements of text data whether said each of said one or more corresponding elements of text data contains text-defining information, (iv) where said each of said one or more corresponding elements of text data contains text-defining information, said each of said one or more corresponding elements of text data which contains text-defining information providing an element of said printing data incorporating information pertaining to text defined by said each of said one or more corresponding elements of text data which contains text-defining information, and (v) where none of said one or more corresponding elements of text data contains text-defining information, said each element of combined data providing an element of said printing data containing only image and/or feature-defining information.

11. A method according to claim 10, wherein each element of said printing data within a defined spacing from another element of said printing data which incorporates information defining an edge region of text in a pictorial representation of the printing data is modified to incorporate information defining, in said pictorial representation of the printing data, a surrounding region separating said text from other information contained in said pictorial representation.

12. A method according to claim 9, wherein said text is laid down on a substrate preparatory to digitisation.

13. A method according to claim 9, wherein said text is digitised directly as character data with associated locational and attribute information.

14. A method according to claim 9, comprising the further step of outputting said printing data to provide one or more representations of said selected region usable for printing purposes, said outputting step comprising the production of a plurality of colour separations, for colour printing.

15. A method of making a map comprising the steps of:

(a) processing data collected by remote-sensing to provide image data usable to define a pictorial representation of a selected region, said image data consisting of a multiplicity of elements of data, and each of said elements of data containing image information, (b) digitising a representation of geographical features within said selected region to provide feature data, said feature data consisting of a multiplicity of elements of data, and at least some of said elements of data containing feature-defining information, (c) integrating said image data with said feature data to provide combined data usable to define a pictorial representation of said selected region, said combined data consisting of a multiplicity of elements of data, (d) preparing text for disposition at appropriate locations within said selected region in a pictorial representation thereof, (e) digitising said text to provide text data, said text data consisting of a multiplicity of elements of data, and at least some of said elements containing text-defining information, and (f) integrating said text data with said combined data to provide printing data including image data, feature data containing feature-defining information and text data containing text-defining information, and consisting of a multiplicity of elements of data, wherein said image data and feature data integrating step includes (i) establishing, for each element of image data, whether any corresponding element or elements of feature data exist, (ii) for any element of said image data to which no element of feature data corresponds, said any element providing an element of said combined data containing only image information, (iii) for each element of image data for which one or more corresponding elements of feature data exist, establishing for each of said one or more corresponding elements of feature data whether said each of said one or more corresponding elements of feature data contains feature-defining information, (iv) where said each of said one or more corresponding elements of feature data contains feature-defining information, said each of said one or more corresponding elements of feature data which contains feature-defining information providing an element of said combined data incorporating information pertaining to a feature or features defined by said each of said one or more corresponding elements of feature data which contains feature-defining information, (v) where none of said one or more corresponding elements of feature data contains feature-defining information, said each element of image data providing an element of said combined data containing only image information, and (vi) for each element of said combined data within a defined spacing from another element of said combined data which incorporates information defining an edge region of a feature in a pictorial representation of the combined data, modifying said each element of said combined data to incorporate information defining, in said pictorial representation of the combined data, a surrounding region separating said feature from other information contained in said pictorial representation, and wherein said combined data and text data integrating step includes (i) establishing, for each element of combined data, whether any corresponding element or elements of text data exist, (ii) for any element of said combined data to which no element of text data corresponds, said any element providing an element of printing data containing only image and/or feature-defining information,.

(iii) for each element of combined data for which one or more corresponding elements of text data exist, establishing for each of said one or more corresponding elements of text data whether said each of said one or more corresponding elements of text data contains text-defining information, (iv) where said each of said one or more corresponding elements of text data contains text-defining information, said each of said one or more corresponding elements of text data which contains text-defining information providing an element of said printing data incorporating information pertaining to text defined by said each of said one or more corresponding elements of text data which contains text-defining information, (v) where none of said one or more corresponding elements of text data contains text-defining information, said each element of combined data providing an element of said printing data containing only image and/or feature-defining information, and (vi) for each element of said printing data within a defined spacing from an element of said printing data incorporating information defining an edge region of text in a pictorial representation of the printing data, modifying said each element of said printing data to incorporate information defining, in said pictorial representation of the printing data, a surrounding region separating said text from other information contained in said pictorial representation.

16. A method according to claim 15, comprising the further step of outputting said printing data to provide one or more representations of said selected region usable for printing purposes, wherein (a) each element of image data is a pixel,
(b) said data collected by remote-sensing is collected by satellite-sensing, and
(c) said data collected by remote-sensing is digital data.

17. A method of making a map comprising the steps of:

(a) processing data collected by remote-sensing to provide image data usable to define a pictorial representation of a selected region, said image data consisting of a multiplicity of elements of data, and each of said elements of data containing image information, (b) digitising a representation of geographical features within said selected region to provide feature data, said feature data consisting of a multiplicity of elements of data, and at least some of said elements of data containing feature-defining information, and (c) integrating said image data with said feature data to provide combined data usable to define a pictorial representation of said selected region, said combined data consisting of a multiplicity of elements of data, wherein said image data and feature data integrating step includes (i) establishing, for each element of image data, whether any corresponding element of feature data exists, (ii) for any element of said image data to which no element of feature data corresponds, said any element providing an element of said combined data containing only image information, (iii) for each element of image data for which a corresponding element of feature data exists, establishing whether said element of feature data contains feature-defining information, (iv) where said corresponding element of feature data contains feature-defining information, said corresponding element of feature data which contains feature-defining information providing an element of said combined data incorporating information pertaining to a feature or features defined by said corresponding element of feature data which contains feature-defining information, and (v) where said corresponding element of feature data does not contain feature-defining information, said each element of image data providing an element of said combined data containing only image information.

* * * * *